March 30, 1926.                                                        1,578,524
H. A. HOUSTON ET AL
REVERSIBLE TRUCK
Filed April 26, 1923        2 Sheets-Sheet 1
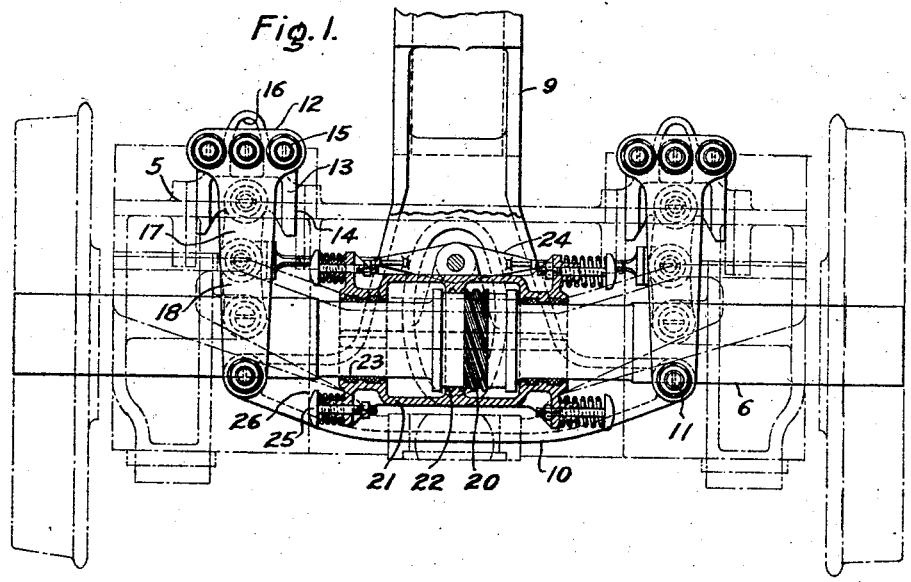
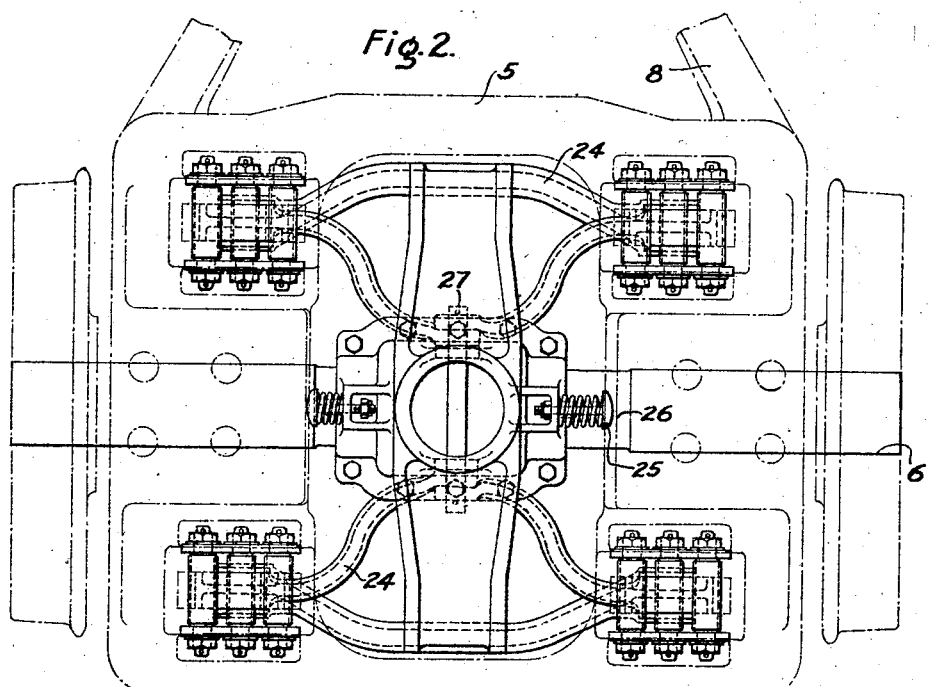
WITNESSES:
INVENTORS
Harold A. Houston &
Frank L. Alben
BY
ATTORNEY

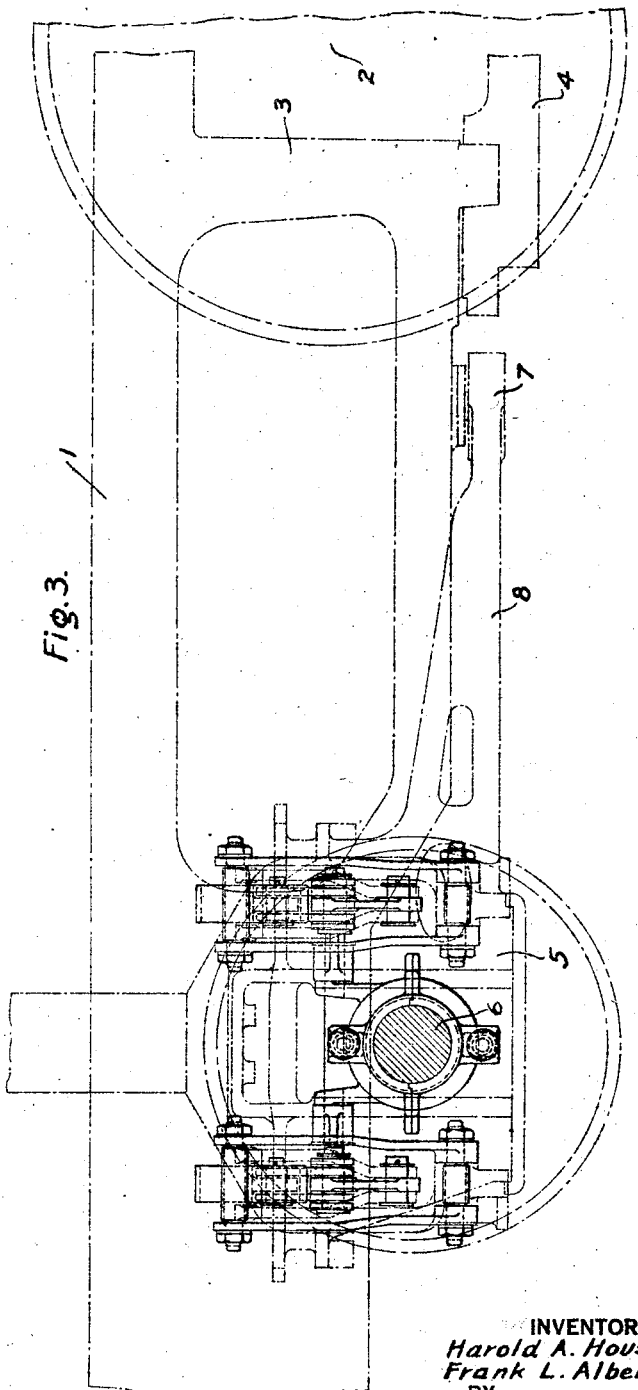

Patented Mar. 30, 1926.

1,578,524

UNITED STATES PATENT OFFICE.

HAROLD A. HOUSTON AND FRANK L. ALBEN, OF WILKINSBURG, PENNSYLVANIA, ASSIGNORS TO WESTINGHOUSE ELECTRIC & MANUFACTURING COMPANY, A CORPORATION OF PENNSYLVANIA.

REVERSIBLE TRUCK.

Application filed April 26, 1923. Serial No. 634,872.

*To all whom it may concern:*

Be it known that we, HAROLD A. HOUSTON, a citizen of the United States, and a resident of Wilkinsburg, in the county of Allegheny and State of Pennsylvania, and FRANK L. ALBEN, a citizen of the United States, and a resident of Wilkinsburg, in the county of Allegheny and State of Pennsylvania, have invented a new and useful Improvement in Reversible Trucks, of which the following is a specification.

Our invention relates to railway vehicles, more especially to the guiding trucks that are employed therewith for the purpose of providing proper steering action of the vehicle body relative to the rails.

It is among the objects of this invention to provide a radial truck which shall be adapted to provide positive steering action automatically for any direction of movement of the vehicle without manual or other control mechanism.

It is a further object of this invention to provide such an automatic steering device which shall be of simple, compact and durable construction, which shall be mechanically efficient and which shall be adapted for actuating the various types of guiding or steering mechanisms embodied in present types of locomotives and the like.

Various forms of guiding mechanism embodying heart-cam swing-link mountings have been developed and employed on guiding trucks in conjunction with the center-pin connection to a swing bolster which is suspended from such links. Most of these structures effect steering or trailing of the guide truck relative to the curvature encountered on the rails. To obtain a positive steering mechanism, it has been necessary to provide some actuating means for shifting the position of the links on the truck transom or frame so as to direct the thrust transmitted from the vehicle body laterally in a direction depending upon the rail curvature. These shifting mechanisms have been of various types embodying manually actuated levers or control operatively connected with liquid pressure or electrical solenoid actuating devices.

In a copending application of Frank L. Alben, Serial No. 599,521, filed November 7, 1922, is described a swing bolster having fixed and movable supports. Our present invention is directed to a shifting device that is particularly applicable as actuating means for the fixed and movable supports of said bolster. We provide a shifting device which is mechanical in its function and entirely automatic in producing the steering action of the guide truck relative to the vehicle body and the rails. The device embodies a screw-and-nut mechanism which constitutes parts of the rotating axle and the shifting links.

In the accompanying drawings constituting a part hereof and in which like reference characters designate like parts, Figure 1 is an end elevational view, partially in section, of a guiding truck embodying the principles of our invention;

Fig. 2 is a plan view thereof, showing the relative position and connection of the shifting mechanism; and Fig. 3 is a side elevational view thereof.

Referring to Fig. 3, the structure therein illustrated comprises a portion of a vehicle frame 1 journaled in the usual manner to a plurality of wheeled axles 2 between the vehicle pedestal jaws 3 of the frame, by suitable journal boxes which are held in position by the pedestal binders 4. A radial or guiding truck, comprising an integral frame 5 journaled to the wheeled axle 6, is connected to the vehicle frame 1 by a ball-joint connection 7 with a radius bar 8 comprising an integral portion of the truck frame 5. The truck is further connected to the vehicle by a center-pin connection 9, forming a part of a swing bolster 10, which is pivotally connected at the joints 11 to a plurality of cam links 12, associated with movable supports 13, which are adapted to move vertically in recesses 14 of the main frame 5.

The links 12 are provided with a plurality of rollers 15, the outer ones of which are adapted to seat on the movable supports 13, and the center roller being adapted to rest in a notched portion of the truck frame 5. The supports 13 are provided with an elongated opening 16, by which they are suspended from the center roller of the cam link 12, in their idle position. The movable supports 13 are further connected to the truck frame by a plurality of links 17 and 18 comprising a toggle joint that is associated with a shifting mechanism comprising a screw thread member 20 which may form an integral portion of the axle 6.

A nut member 21, having a threaded portion 22 which is adapted to co-operatively engage the screw-threaded member 20, is rotatably mounted on the shaft 6 by a plurality of bearings 23 that are adapted to move parallel to the longitudinal axis of said shaft, and is connected to the toggle members by shifting levers 24. The nut 21 is further provided with a plurality of spring bumpers 25 which are adapted to seat against the stops 26 forming a part of the truck frame 5, for the purpose of restraining lateral movement thereof and to provide constant contact against the threads 22 to effect engagement with the screw thread member 20. The shifting levers 24 are hinged, at their point of connection, with the shifting mechanism and are secured in position by a pin 27.

Our device operates briefly as follows:

If the guide truck has a leading position on the vehicle, its function is to provide positive steering action to guide the vehicle body relative to the curvature of the rail for the purpose of reducing flange wear on the drive wheels and for minimizing stresses set up in the vehicle body due to twisting and bending and also to provide stability. When the truck is in a trailing position, it must be so constructed as to offer the least resistance to the rail so as not to interfere with the proper operation of the vehicle.

The features embodied in the above-illustrated radial truck provide for both the steering and the trailing functions automatically by means of the cam-link toggle-actuated steering mechanism. This mechanism permits of supporting the outer link rollers 15 for positive steering by which the swing bolster 10 is adapted to be supported on but one roller of each link, an outer and an inner roller operating simultaneously, depending on the direction of the curve of the rail, and, in the idle position, the swing bolster is supported on the center rollers direct on the truck frame 5.

The shifting of the link supports through the toggle mechanism is effected through the screw-and-nut mechanism and, for a rotation of the axle in a given direction, the mechanism will be shifted to one side, which engages the supports with the outer rollers and, for the reverse direction, to the opposite side, which drops the supports and suspends them by the center roller 15 direct to the truck frame. As illustrated in Fig. 1, the nut mechanism is in the position of the shaft rotating in a left-hand direction from the right-hand side of the drawing, which shows the link supports in position but, immediately upon the reversing of the axle 6, the compression on the spring members 25, effecting engagement of the threads 22 with the threads 20, will cause the nut member 21 to traverse towards the right-hand side of the thread 20, which breaks the toggle and drops the support, thereby resting the links 12 on the truck frame.

It will be readily seen that this provides a steering action of the center pin 9 when the truck is in a leading position and, if the toggle connection is reversed, by the opposite rotation of the axle 6, the center-pin 9 will be suspended from the idle center rollers 15.

Although we have described a specific embodiment of our invention, it will be obvious to those skilled in the art that various modifications may be made in the details of construction. For instance, the general details may be altered to comply with the specific service and operating conditions to which such a device may be subjected, and the screw-and-nut mechanism may be of any design without respect to the number and pitch of thread depending upon the speed at which the change from a leading to a trailing position is to be made, and the yielding bumper members may be of any design, depending upon the distance of travel of the nut member and the contact to be applied to effect engagement of the threads. The shifting mechanism may further be embodied in any suitable type of radial truck with various types of heart-and-cam link suspensions. These and other changes may be made in the details of construction without departing from the principles herein set forth.

We claim as our invention:—

1. In a radial truck, the combination of means for providing positive steering or trailing of the truck relative to the center-pin connection, and automatic means for adjusting said connection to idle and to positive positions, said steering means comprising a plurality of sewing links suspended from the supporting frame of said truck which are adapted to carry a swing bolster, and said automatic changing means comprising a screw-and-nut mechanism which is operatively connected to said links.

2. In a radial truck, the combination of means for providing positive steering or trailing of the truck relative to the center-pin connection, and automatic means for adjusting said connection to idle and to positive positions, said steering means comprising a plurality of swing links mounted upon movable supports associated with the truck frame, a swing bolster pivotally connected to said links, said automatic changing means comprising a screw-threaded member associated with the wheel axle of said truck, and a threaded housing engaging said screw, which is operatively connected to said links.

3. In a radial truck, the combination of means for providing positive steering or trailing of the truck relative to the center-pin connection, automatic means for adjusting said connection to idle and to positive positions, said steering means comprising a plurality of swing links mounted upon movable supports associated with the truck frame, a swing bolster pivotally connected to said links, said automatic adjusting means comprising a screw-thread member associated with the wheel axle of said truck provided with yielding restraining members to effect engagement of the threaded portion, a threaded housing engaging said screw, and a connecting rod for engaging said links.

4. In a radial truck, the combination of means for providing positive steering or trailing of the truck relative to the center-pin connection, and automatic means for adjusting said connection to idle and to positive positions, said steering means comprising a plurality of swing links mounted upon movable supports associated with the truck frame and a swing bolster pivotally connected to said links, and said automatic-changing means comprising a screw-thread member associated with the wheel axle of said truck, and a threaded housing engaging said screw which is operatively connected to said links.

5. A radial truck comprising a wheeled frame and radius bar construction, a swing bolster comprising a center-pin mounting by which said truck is connected with the vehicle frame, a plurality of swing links by which said bolster is suspended from movable supports associated with said frame, a shifting device for actuating said supports comprising a screw-and-nut mechanism having a shifting lever associated with a plurality of toggles connected to said supports, and a plurality of spring members secured to said nut member to maintain contact thereof with the threaded portion of the screw.

In testimony whereof, we have hereunto subscribed our names this 23rd day of April, 1923.

HAROLD A. HOUSTON.
FRANK L. ALBEN.